United States Patent Office 3,453,498
Patented July 1, 1969

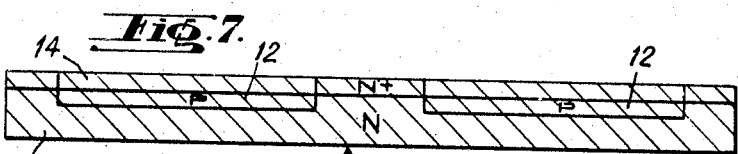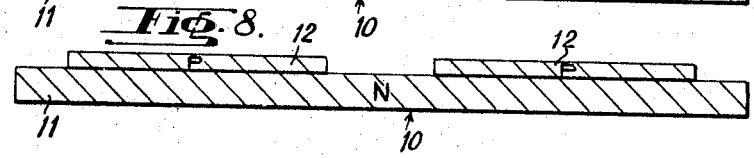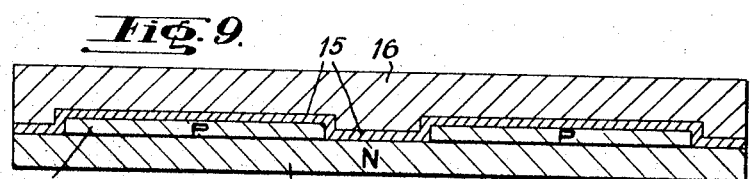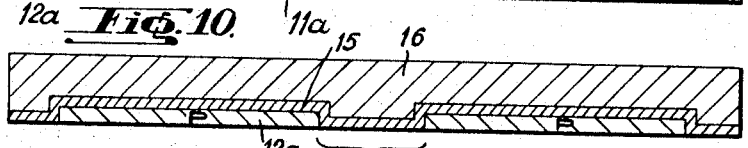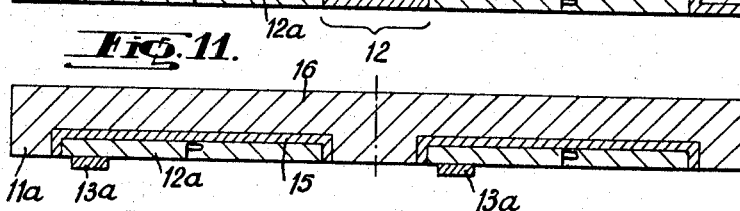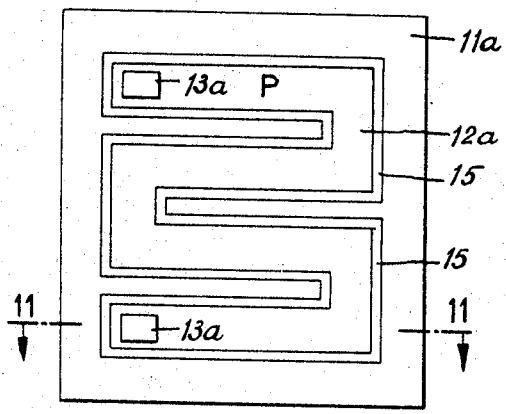

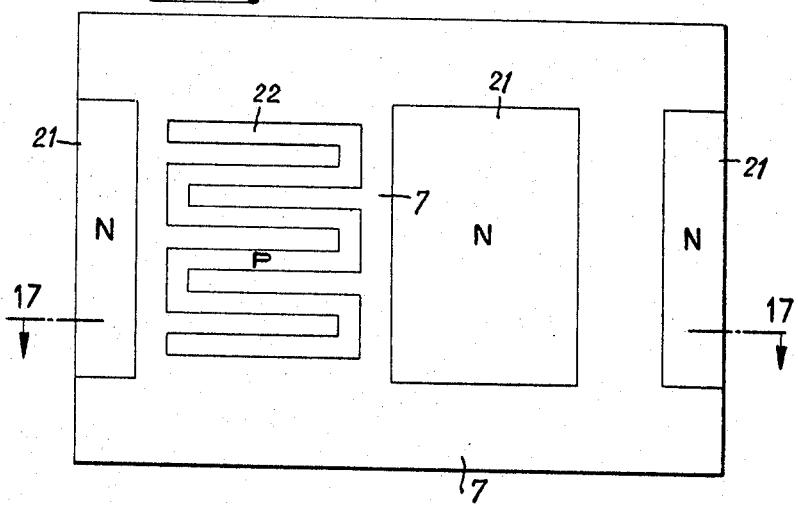

3,453,498
SEMI-CONDUCTING RESISTANCE AND A METHOD FOR ITS MANUFACTURE
Kurt Hubner, Neuchatel, Switzerland, assignor to Centre Electronique Horloger S.A., Neuchatel, Switzerland
Filed Apr. 4, 1966, Ser. No. 539,887
Claims priority, application Switzerland, Apr. 7, 1965, 4,880/65
Int. Cl. H01l 9/00
U.S. Cl. 317—101      6 Claims

ABSTRACT OF THE DISCLOSURE

Semi-conducting resistance constituted by a layer of semi-conducting material of the same type of conductibility throughout the layer, this layer being insulated from a block which is its support, by a dielectric quartz layer, in contact with the layer of semi-conducting material. It is insulated from the block laterally and by its face adjacent to the block, the opposite face being uncovered.

---

The present invention has for object a semi-conducting resistance and a method for its manufacture.

Such resistances are already known, which may be either mono-diffused, or double-diffused as will be seen later on.

These resistances have a high parasite capacity. The main object of the invention is the production of a resistance of low parasite capacity and which may be produced with accuracy in a range extending up to several megohms.

The semi-conducting resistance according to the invention is characterized in that it is constituted by a layer of semi-conducting material of the same type of conductibility in the whole layer, this layer being insulated from a block which is its support, by a dielectric layer, in contact with the layer of semi-conducting material.

FIGURES 1 to 6 of the accompanying drawing show known semi-conducting resistances whereas FIGURES 7 to 18 show, by way of examples, three embodiments of the resistance and of the method according to the invention.

FIGURES 7 to 11 are sections which show the different stages of a first embodiment of the method, for the manufacture of an independent resistance, FIGURE 1 being a sectional view along 11—11 of FIG. 12.

FIGURE 12 is a plan view of the resistance thus produced according to this first embodiment of the method.

FIGURES 13 to 17 are sections showing the different stages of a second embodiment of the method, for the manufacture of a resistance contained in an integrated circuit, FIGURE 17 being a section along 17—17 of FIG. 18.

FIGURE 18 is a plan view of the block adapted to form an integrated circuit and enclosing said resistance.

Figure 1:
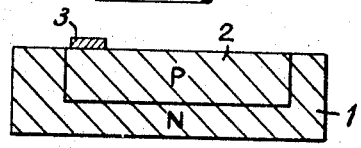
FIGURE 1 is a sectional view along 1—1 of FIG. 2, of a known mono-diffused resistance.
Figure 2:
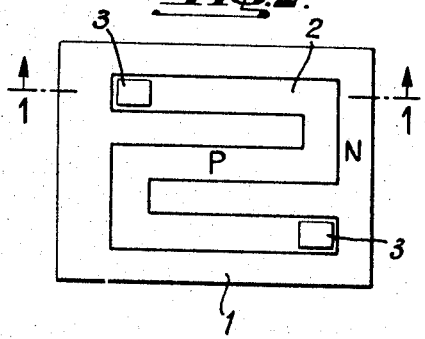
FIGURE 2 is a plan view of this resistance.

FIGURE 1 is a section along the line 1—1 of FIG. 2 of a mono-diffused semi-conducting resistance obtained by a known method, FIG. 2 being a plan view. This resistance includes an N-type silicon block 1 in this example. In this block one has diffused a P-type region 2, and in serpentine shape. The junction PN which results therefrom isolates region 2 from region 1. The contacts 3 at the ends of region 2 permit of current passing along the region 2. This latter determines the value of the resistance, by the resistivity of region 2, its section and its length. The resistance thus obtained has at the junction a high parasite capacity compared to that of ordinary resistances and a value included between a few ohms and 40K Ohms for a ratio between the length and the width of the coil of 200; accuracy is further determined by diffusion technique.

Figure 3:
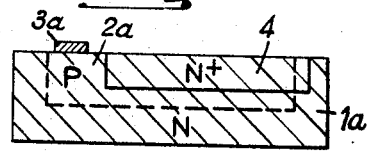
FIGURE 3 is a sectional view along 3—3 of FIG. 4, of a known double-diffused resistance.
Figure 4:
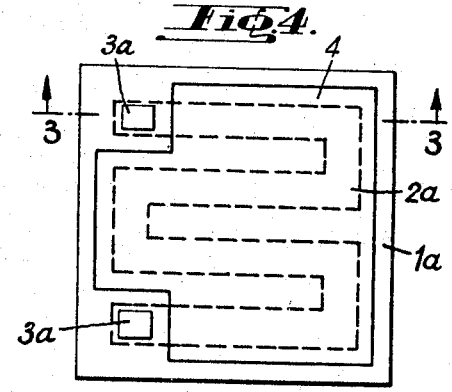
FIGURE 4 is a plan view of this resistance.

FIGURE 3 is a section along 3—3 of FIG. 4 of a double-diffused semi-conducting resistance according to a known method, FIG. 4 being a plan view of this resistance.

The signs 1a, 2a and 3a designate the same regions as 1, 2, 3, respectively, of FIGS. 1 and 2. Over the greater part of region 2, one has diffused a N+-type region 4, N+ indicating that the coating is greater than for N. This region 4 has for effect to reduce the section of region 2a and thus increase its resistance. However, the surface of junction PN also increases, which brings about a considerable increase of the parasite capacity.

Figure 5:
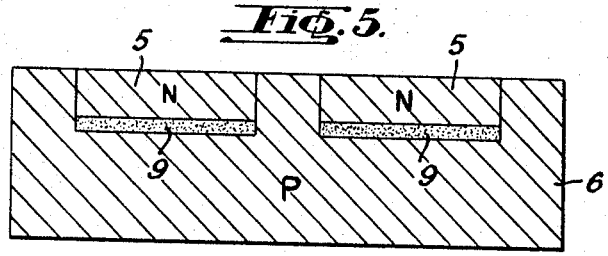
FIGURE 5 is a diagrammatic sectional view of a body with insulated compartments, adapted to form an integrated circuit, showing the known technical art, with insulation by the junction P–N.
Figure 6:
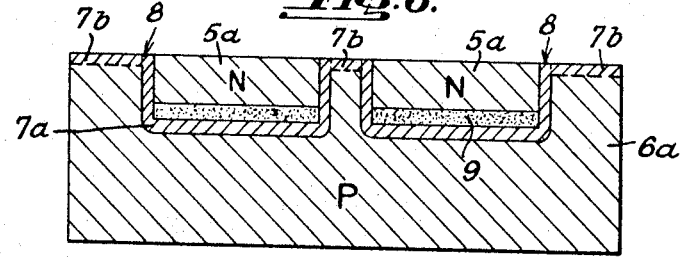
FIGURE 6 is a similar view, showing another known technical art, with insulation by quartz walls.

The elements shown in FIGS. 1 to 4 constitute independent resistances. In FIGS. 5 and 6, one has shown regions isolated one from the other, ready to accept the diffused components forming a known integrated circuit, one region at least of which contains a resistance.

The integrated circuit shown in FIG. 5 includes two N-type regions 5, these two regions 5 corresponding to the blocks 1 of FIGS. 1 to 4 and being isolated one from the other by junctions PN, the whole being mounted in a silicon block 6. The regions 9 are constituted by heavily coated regions, which have a very low resistivity. They are obtained by diffusion technique and serve to reduce the lateral resistance in the isolated regions 5. In one at least of these regions 5, one has diffused a resistance whereas in the other, one can have diffused a diode, a transistor, etc., this according to the above mentioned known methods. These different elements, the number of which may obviously be higher than two contrarily to what is shown in FIG. 5, are insulated one from the other by junctions, but may be connected at their surface by dried off metal strips according to a well known method. The disadvantage of the integrated circuits thus obtained is the insulation by the junctions PN which is accompanied by a high parasite capacity between the elements thus isolated.

FIG. 6 shows a known method for the improvement of insulation technology. This method consists in replacing, in the case of FIG. 5, the insulating junctions by quartz layers 7 disposed between the isolated regions 5a and the rest of the support 6a (corresponding to 5 and 6 of FIG. 5). The layer of quartz 7a may either end at the surface, at the points designated by the arrows 8, or be prolonged and connect at 7b the insulation layers of several isolated regions 5 as shown in dash lines in FIG. 6.

It is obvious that in these examples, the regions N may be replaced by regions P and inversely.

FIGURE 7 shows a block 11 of N-type silicon after producing the regions 12 and 14 corresponding to the regions 2a and 4 of FIG. 4. The surface is then placed into contact with an electrolytic bath by application of tension between the lower surface 10 of the block 11 and an electrode immersed in the bath. The electrochemical reaction which results from this operation only removes the N-type silicon, this because the junction PN is polarized in the opposite direction. The reaction necessitates the presence of holes which are very infrequent in the N+-type region. They must be created by lighting. This increases the leakage currents through the junction with the result that the P-type layer 12 is also slightly attacked. In practice, one however observes a ratio of attacking strength which is higher than 10:1. One thus obtains the structure shown in FIG. 8.

One then oxidizes the surface of this structure according to FIG. 8 as shown at 15 in FIG. 9 and one then applies a thick layer of polycrystalline silicon 16. These operations are well known in the trade. Afterwards, one removes the whole N-type block 11a by first of all grinding and then polishing the inner surface.

One thus obtains the structure shown in FIG. 10. In order to be sure that all the N-type material is removed, one may continue the operation until the entire part 12 of the oxidized layer 15, that is to say of quartz, is removed as shown in FIG. 11. Afterwards, one metallizes the P-type layer 12a to establish the contacts 13a. One may then render it passive by covering it with a layer of oxide following well-known techniques, after which it is sufficient to cut out the structure thus obtained to form the resistances. The resistance obtained is shown in FIG. 12 which is a view from below corresponding to the left-hand side of FIG. 11.

FIGURES 13 to 18 show an embodiment of the method in which the resistance is formed in an integrated circuit. To the left of these figures, one has shown the different stages leading to the production of a resistance and to the right the corresponding stages leading to the production of an N region insulated by layers of quartz as shown in FIG. 6.

FIGURE 13 shows a silicon block 21 (of the N type in this example) in which one has diffused a region 22 in a straight line or coiled-shaped, and which will constitute a resistance in the integrated circuit. This operation, the details of which are not shown, is carried out according to planar methods well known in the art. Afterwards, one diffuses an N-type region 24 over the whole surface of the block 21. The object of this diffusion is:

(1) To reduce the section of the region 22 in order to increase its resistance as in the embodiment shown in FIGS. 7 to 12;

(2) This layer 24 serves for the production of a region of high conductibility like the region 9 of FIG. 6;

(3) The region 24 serves for the production of the same concentration of impurities over the whole surface of the plate, which will later render each point susceptible to be attacked electrochemically at the same speed.

After the application of the layer 24, the whole surface is oxidized as shown at 23 in FIG. 13. One then removes this oxide by well-known photolithographical technical means, in the regions 25 where it is desired to form a resistance and in the regions 26 where it is desired to have an insulation. One then obtains the structure shown in FIG. 14.

One then establishes a contact with the inner face 20 of the block 21 and one plunges it into an electrolytic bath where it is attacked through the oxide mask 23. This operation practically only removes the N-type material. FIG. 15 shows the structure thus obtained. To the left, the P-type material, adapted to constitute the resistance, has remained intact and all the N-type material which surrounded it above and on the sides has been removed. To the right, where it is desired to obtain a quartz insulation wall, one has obtained a hole in the N-type material. Since the layer 24 has been applied over the whole surface, the attacking speeds to the left and to the right are approximately identical.

One then removes the oxide layer 23 and one covers the whole with a fresh oxide layer 27. One then applies a thick deposit 28 of polycrystalline silicon. One then obtains the structure shown in FIG. 16.

One then grinds and polishes the inner surface an electrochemical polishing being carried out if necessary, which gives us the structure shown in FIG. 17. FIG. 18 is a plan view from below of FIG. 17. These two figures show the final structure with the resistance 22 to the left, an isolated region 21 to the right and, partly shown, two isolated regions at the ends. These isolated regions consist of an N+ thickly coated layer, covered with a layer N. They are ready to be diffused according to planar technique for instance to produce transistors, diodes, etc.

Several modified forms are possible:

In FIG. 13 one may diffuse the layer 24 in two stages, one which is deep in the region 25 and another less deep covering the remainder of the surface. This permits of regulating independently one of the other the thickness of the resistance 22 and that of the layer 24 in the isolated regions.

A modified form of the structure shown in FIG. 17 is obtained by grinding and polishing to a greater degree so as to remove the quartz layer 27 at the surface as already indicated with reference to FIG. 11. Since the thickness of the layer 27 may be ten times thinner than that of the resistive region 22, or still less, this will not considerably change the section and thus the resistance of the region 22.

The advantages of the resistances obtained by the method of the invention are the following:

(a) *Resistance according to FIG. 11*

This resistance is not insulated by a junction PN, but by quartz layers, which considerably reduces the parasite capacity as well as the leak currents through the insulation by junction. In this respect, the resistance is equivalent to a resistance produced by deposit of a thin layer of a quartz substratum, but has the further advantage of presenting a perfectly flat surface for subsequent operations of planar technique and of being constituted by a monocrystalline material. This latter point increases the reproductivity because the resistance of layers deposited in polycrystalline form depends on the magnitude of the crystals, which is difficult to control.

(b) *Resistance according to FIG. 17*

This resistance, while preserving all the above mentioned advantages, may be established in an integrated circuit with insulation by quartz layers. The surface simplifies the carrying out of the subsequent operations necessary to obtain transistors, diodes, etc. in the isolated regions and in particular the metallization necessary to interconnect these elements.

In the examples described, attack is carried out by electrochemical means. The craftsman readily imagines that one could also carry out a chemical attack taking into account the known fact that chemical attack does not permit, as in the case of electrochemical attack, differential attack of the *n* and *p* material. Further, it is not indispensable that insulation be effected by a layer of quartz and one could take into consideration another dielectric. Thus the possibilities of carrying out the invention may be resumed by the following table:

|  | Electrochemical attack | Chemical attack |
| --- | --- | --- |
| Quartz insulation or other dielectric. | (a) Individual resistance. (b) Integrated circuit. | (a) Individual resistance. (b) Integrated circuit. |

What I claim is:

1. A semi-conducting resistance assembly, comprising a supporting block, an insulating dielectric layer disposed on and within said block, and a layer of semiconducting material disposed on said insulating dielectric layer and forming the resistance, said latter layer being constituted throughout by a semiconducting material of one single type of conductivity.

2. A semi-conducting resistance assembly, comprising a supporting block, an insulating silicon dioxide layer disposed on and within said block, and a layer of semiconducting material disposed on said insulating silicon dioxide layer and forming the resistance, said latter layer being constituted throughout by a semi-conducting material of one single type of conductivity.

3. A semi-conducting resistance assembly, comprising a supporting block, an insulating silicon dioxide layer disposed in the shape of a caisson within said block, and a layer of semi-conducting material disposed within said caisson and forming the resistance, said latter layer being constituted throughout by a semi-conducting material on one single type of conductivity, and said caisson being open towards a surface of said supporting block.

4. An assembly according to claim 3, wherein said block is a silicon substratum of an integrated circuit.

5. An assembly according to claim 3, wherein said caisson is of serpentine shape.

6. In an integrated circuit, a semi-conducting resistance assembly, comprising a supporting silicon block as a substratum, a serpentine caisson of silicon disposed on a surface of the silicon block and within the latter, a layer of semi-conducting material disposed within said caisson and being constituted throughout by a semi-conducting material of one single type of conductivity, said caisson being open towards said surface of said block.

References Cited

UNITED STATES PATENTS

| | | |
|---|---|---|
| 2,758,256 | 8/1956 | Eisler. |
| 3,290,753 | 12/1966 | Chang. |
| 3,312,879 | 4/1967 | Godejahn. |
| 3,337,780 | 8/1967 | Robbins. |
| 3,361,936 | 1/1968 | Umantsev. |

ROBERT K. SCHAEFER, *Primary Examiner.*

J. R. SCOTT, *Assistant Examiner.*

U.S. Cl. X.R.

317—235; 338—306